(12) United States Patent
Li

(10) Patent No.: US 10,907,953 B1
(45) Date of Patent: Feb. 2, 2021

(54) SIX DEGREE-OF-FREEDOM (DOF) MEASURING SYSTEM AND METHOD

(71) Applicant: TONGJI UNIVERSITY, Shanghai (CN)

(72) Inventor: Anhu Li, Shanghai (CN)

(73) Assignee: TONGJI UNIVERSITY, Shanghai (CN)

( * ) Notice: Subject to any disclaimer, the term of this patent is extended or adjusted under 35 U.S.C. 154(b) by 0 days.

(21) Appl. No.: 16/702,482

(22) Filed: Dec. 3, 2019

(30) Foreign Application Priority Data

Jul. 9, 2019 (CN) .......................... 2019 1 0615144

(51) Int. Cl.
*G01B 11/00* (2006.01)
*G01S 17/42* (2006.01)

(52) U.S. Cl.
CPC ............ *G01B 11/002* (2013.01); *G01S 17/42* (2013.01)

(58) Field of Classification Search
CPC ..... G01B 11/002; G01B 11/03; G01B 11/026; G01B 5/004; G01B 5/008; G01S 17/42; G01S 17/66; G01S 17/46; G01S 17/48; G01S 17/50; G01S 17/58
USPC ...... 356/614–624, 138, 139.03–139.08, 147, 356/148, 152.1–153; 396/90, 91, 111, 396/529, 533; 359/200.1, 203.1, 210.2, 359/226.2, 384, 831
See application file for complete search history.

(56) References Cited

U.S. PATENT DOCUMENTS

| 5,227,985 | A  | * | 7/1993  | Dementhon ............ G01S 5/163 345/158 |
| 7,019,825 | B2 | * | 3/2006  | Roh ....................... B25J 9/1692 356/139.03 |
| 7,312,862 | B2 |   | 12/2007 | Zumbrunn et al. |

(Continued)

FOREIGN PATENT DOCUMENTS

| CN | 102636139 A | 8/2012 |
| CN | 105806180 A | 7/2016 |

(Continued)

*Primary Examiner* — Christina A Riddle
(74) *Attorney, Agent, or Firm* — Hamre, Schumann, Mueller & Larson, P.C.

(57) ABSTRACT

This invention disclosures a six degree-of-freedom (DOF) measuring system and method. The measuring system comprises a tracking measurement device and a target. The tracking measurement device includes a processor, a camera and two rotation optical components connected with the processor respectively, which are arranged in sequence. The camera boresight and the optical axis of two rotation optical components are coaxial, and each rotation optical component can rotate independently. The target is mounted on the tested object, which contains at least three markers with known distance constraints. In addition, at least one marker does not coincide with the midpoint of the line connecting any two of the remaining markers. Compared with the prior technologies, this invention realizes a dynamic real-time measurement of six DOF for the tested object. In the process of measurement, only the target is fixed on the object. The target has the advantages of simple structure, less influence on the actual operation of the target and easy use. Meanwhile, the calculation process of 6 DOF measurement is simplified, and the real-time and reliability of the measurement method is improved.

10 Claims, 10 Drawing Sheets

(56) References Cited

U.S. PATENT DOCUMENTS

| | | | |
|---|---|---|---|
| 7,576,836 B2 | 8/2009 | Bridges | |
| 9,976,947 B1* | 5/2018 | Hoffer, Jr. | ............... G01J 4/00 |
| 2007/0247615 A1* | 10/2007 | Bridges | ................ G01S 5/163 |
| | | | 356/139.03 |
| 2012/0265479 A1* | 10/2012 | Bridges | ............... G01S 7/4813 |
| | | | 702/135 |
| 2018/0231639 A1* | 8/2018 | Ohtomo | ............... G01S 7/4817 |

FOREIGN PATENT DOCUMENTS

| | | |
|---|---|---|
| CN | 107246866 A | 10/2017 |
| CN | 107505610 A | 12/2017 |

\* cited by examiner

SIX DEGREE-OF-FREEDOM (DOF) MEASURING SYSTEM AND METHOD

TECHNICAL FIELD

This invention relates to the field of space geometry measurement, in particular to a six degree-of-freedom measurement system and method.

BACKGROUND

With the development of science and technology, the demand for pose measurement for industrial equipment is increasing. For example, during the operation of industrial robots, due to the manufacturing error, control accuracy and the change of environmental temperature, the accuracy of the end-effect of the robot will be greatly affected. Therefore, it is necessary to measure the end-effect of the industrial robot in real time and then feedback the position error to achieve close-loop control and finally realize the high-precision dynamic operation of the industrial robot. Besides, in the assembly process of large equipment, it is necessary to measure the spatial orientation of the parts in real time to ensure the assembly proceeded smoothly. At present, the 6 degree-of-freedom (DOF) measuring device for testing the end-effect of an industrial robot has some shortcomings, such as the difficulty of operation, the complexity of the whole machine, the large occupation of space, the difficulty of carrying, and the high cost, which limits its application to industrial production.

China. Pat. No. 107246866A to Lin, et al. discloses a high-precision 6 DOF measurement system and method, and proposes a system for measuring the relative pose of the ahead and behind object. Two tilt sensors and visual imaging system are used to measure the pose of the object. The two tilt sensors and the target with characteristic points need to be fixed on the tested object, which will affect the actual operation of the object. Besides, the installation of the system is complex and the cost is high.

China. Pat. No. 107505610A to Dong, et al. discloses a 6 DOF pose measurement method and device. The device receives light emitted by multiple light sources and converts it into electrical signals by the sensitive surface of two-dimensional position sensitive detector (PSD) in turn. According to the preset rules of the emergent beam and the received electrical signals, the 6 DOF pose information of the sensitive surface of two-dimensional PSD relative to the first plane or the 6 DOF pose of the first plane relative to the sensitive surface of two-dimensional PSD can be obtained. However, this method requires multiple light sources as markers and PSD to realize 6 DOF measurement of the object, so the cost of the device is high.

China. Pat. No. 105806180A to Su, et al. proposes a 6 DOF measuring device. The device uses three angle sensors and three displacement sensors to directly measure the 6 DOF of the object. However, the device needs to contact with the object, and can not realize dynamic real-time measurement.

China. Pat. No. 102636139A to Zheng, et al. proposes a 6 DOF dynamic measuring device and method. The device uses six cable-displacement sensors to measure the 6 DOF of the object. However, the measuring device is large and not portable. Meanwhile, this measuring method deals with contact measurement for which the application range is limited.

U.S. Pat. No. 7,312,862 to Zumbrunn, et al. proposes a 6 DOF measurement system that uses the principle of laser reflection to achieve target tracking, and obtains target depth information based on the interference principle, and acquires the image coordinate of the light using a camera. Then the 6 DOF of the target is calculated by the principle of pinhole imaging. This device has high measurement accuracy and fast response speed, but it has the disadvantages of a complex structure, complicated solving process, multiple measuring sensors, high cost of the whole machine, and it is difficult to be popularized and widely used in the industrial field.

U.S. Pat. No. 7,576,836 to Bridges proposes a 6 DOF measurement method and tracking device based on camera. The device uses a rotatable camera to track the tested object in real time and collects the image information of the light source of a target to realize the measurement of 6 DOF for the tested object. During the measurement process, the rotation of the camera will greatly affect the image quality of the light source of the target, which directly affects the measurement accuracy of the 6 DOF of the object.

SUMMARY OF THE INVENTION

This invention provides a 6 DOF measurement system and method in order to overcome the deficiency of the prior technologies. This 6 DOF measurement system includes a tracking measurement device and a target.

The tracking measurement device comprises a processor, a camera and two rotation optical components connected to the processor respectively. The camera and two rotation optical components are arranged in sequence. The boresight of camera and the optical axis of the two rotation optical components remain coaxial, and each rotation optical component can rotate independently.

The target is mounted on the tested object, which contains at least three markers with known distance constraints. In addition, at least one marker does not coincide with the midpoint of the line connecting any two of the remaining markers.

The rotation optical component includes a driving unit, a transmission unit, an angle measuring device and a prism. Cross section of the prism is a right trapezoid. The angle measuring device and the prism are all mounted on the transmission unit, and the driving unit is connected to the transmission unit. And the processor is connected to the drive unit.

The target includes a sleeve and marking rings. The marking rings which include marking shafts and rings. The rings are nested on the outer diameter of the sleeve. The marking shafts are radially distributed on the outer of each ring, and the markers are set at the hanging end of the marking shafts.

A filter is arranged between the camera and the rotation optical components.

And the markers are spherical infrared light emitting diode (LED).

The optical scanning field formed by two rotation optical components is not less than the camera FOV, and the combined imaging FOV formed by the camera and two rotation optical components is not less than the camera imaging FOV.

A camera based target 6 DOF measuring method comprising:

1) Establish the world coordinate system $O_w$-$X_w Y_w Z_w$, camera coordinate system $O_c$-$X_c Y_c Z_c$, target coordinate system $O_t$-$X_t Y_t Z_t$ and tested object coordinate system $O_a$-$X_a Y_a Z_a$.

2) Calibrate the camera to obtain the internal and external parameters of the camera;
3) The rotation optical components are controlled by processor to adjust the camera boresight so that the target falls into the camera FOV;
4) The camera acquires images which include at least three markers. Then the image processing is carried out, and the image coordinates $(X_i, Y_i)$ $(i=1\sim n)$ of the markers are obtained;
6) Acquire the rotation angles of the rotation optical components, then taking the line that connecting the image point corresponding to the marker and the focus F of the camera as the incident beam and based on the vector refraction theorem, the exiting point $K_i(i=1\sim n)$ and the emergent beam vector $S_i(i=1\sim n)$ of the incident beam in the rotation optical components are obtained;
7) The three-dimensional coordinates of the marker can be obtained according to the following equation:

$$\begin{cases} \begin{bmatrix} X_{pi} \\ Y_{pi} \\ Z_{pi} \end{bmatrix} = \begin{bmatrix} X_{ki} \\ Y_{ki} \\ Z_{ki} \end{bmatrix} + \lambda_i \begin{bmatrix} X_{si} \\ Y_{si} \\ Z_{si} \end{bmatrix} \\ (X_{pi} - X_{pj})^2 + (Y_{pi} - Y_{pj})^2 + (Z_{pi} - Z_{pj})^2 = D_{ij}^2, i < j \end{cases}$$

Where $X_{pi}$, $Y_{pi}$ and $Z_{pi}$ are the three-dimensional coordinates of the marker i in the camera coordinate system $O_c$-$X_cY_cZ_c$ in the measurement system; $X_{ki}$, $Y_{ki}$ and $Z_{ki}$ are the three-dimensional coordinates of $K_i$ in the camera coordinate system $O_c$-$X_cY_cZ_c$ in the measurement system; $X_{si}$, $Y_{si}$, and $Z_{si}$ are the three-dimensional coordinates of $S_i$ in the camera coordinate system $O_c$-$X_cY_cZ_c$ in the measurement system, i=1~n; $X_{pj}$, $Y_{pj}$, $Z_{pj}$ are the three-dimensional coordinates of the marker j in the camera coordinate system $O_c$-$X_cY_cZ_c$ in the measurement system, j=1~n. $D_{ij}$ is the distance between the marker i and the marker j, and $\lambda_i$ is the proportional coefficient of the equation i.
8) Among the collected markers, three markers are selected and at least one of them does not coincide with the midpoint of the line connecting the other two markers; The normal vector of the plane where the three markers are located can be solved by the following formula:

$$\vec{N} = \overrightarrow{P_1P_2} \times \overrightarrow{P_2P_3}$$

Where $P_1$ is the first marker, $P_2$ is the second marker, $P_3$ is the third marker, N is the normal vector of the plane where the above three markers are located; Meanwhile, the vector $\vec{N'}$ perpendicular to $\overrightarrow{P_1P_2}$ in the plane where the three markers are located is obtained. Taking $P_2$ as the origin and the orientation vectors of $\overrightarrow{P_1P_2}$, $\vec{N}$ and $\vec{N'}$ as the coordinate directions, the coordinate system is established, and the target coordinate system $O_t$-$X_tY_tZ_t$ coincides with this coordinate system;
9) The attitude matrix R of the target coordinate system $O_t$-$X_tY_tZ_t$ relative to the camera coordinate system $O_c$-$X_cY_cZ_c$ is solved by the directional cosine matrix;
10) According to the image coordinates of the above three markers and based on the pinhole imaging model, the translation matrix T of the target coordinate system $O_t$-$X_tY_tZ_t$ relative to the camera coordinate system $O_c$-$X_cY_cZ_c$ can be solved;
11) The attitude matrix of the tested object relative to the world coordinate system $O_w$-$X_wY_wZ_w$ can be derived as follows:

$$M = M_1 M_2 M_3$$

Where $M_1$ is the conversion matrix of the camera relative to the world coordinate system $O_w$-$X_wY_wZ_w$, $$M_2 = \begin{bmatrix} R & T \\ 0 & 1 \end{bmatrix},$$

$M_3$ is the pose conversion matrix of the tested object coordinate system $O_a$-$X_aY_aZ_a$ relative to the target coordinate system $O_t$-$X_tY_tZ_t$;
12) When the tested object is moving, the rotation optical components are controlled by the visual tracking algorithm to adjust the camera boresight so that the target is kept within the camera FOV, then repeat steps 4 to 11.

Further, the directional cosine matrix in step 9 is $$\begin{bmatrix} \cos(I,i) & \cos(J,i) & \cos(K,i) \\ \cos(I,j) & \cos(J,j) & \cos(K,j) \\ \cos(I,k) & \cos(J,k) & \cos(K,k) \end{bmatrix},$$

where i, j and k are the unit directional vectors of the target coordinate system $O_t$-$X_tY_tZ_t$, and I, J and K are the unit directional vectors of the camera coordinate system $O_c$-$X_cY_cZ_c$. The value of each element in the directional cosine matrix is the cosine value of the angle between the two unit directional vectors.

The visual tracking algorithm in step 12 can be described as that under the condition that the rotation angles of the rotation optical components are known, and taking the line between any marker and the focus F of camera as an incident beam, then an emergent beam vector of the rotation optical component is obtained by the vector ray tracing method. Finally, under the condition that the emergent beam vector is known, a reverse lookup-table method is used to solve the rotation angles of the rotation optical components.

The steps to make the lookup table of the reverse lookup-table method are as follows:

Firstly, deciding the rotation step angle $\theta_{st}$ of prism. Every revolution of prism rotation can be further divided into $360°/\theta_{st}$ steps. Then emergent vectors at different angles are calculated according to the following equation and the lookup table of the relationship between the rotation angle and the unit vector of the emergent beam is established.

$$A_{out} = \frac{n_1}{n_2} A_{in} + \left\{ \sqrt{1 - \left(\frac{n_1}{n_2}\right)^2 [1 - (A_{in} \cdot N)^2]} - \frac{n_1}{n_2}(A_{in} \cdot N) \right\} N$$

Where $A_{in}$ is the unit vector of an incident beam, $A_{out}$ is the unit vector of a refracted beam; N is the normal vector of the refractive surface; $n_1$ is the refractive index of incident medium and $n_2$ is the refractive index of emergent medium.

$$N = \begin{cases} (0, 0, 1), \text{ when the incident surface} \\ \quad \text{or the emergent surface is vertical} \\ (\cos\theta_{ri}\sin\alpha, \sin\theta_{ri}\sin\alpha, \cos\alpha)^T, \\ \quad \text{when the emergent surface is inclined} \\ (-\cos\theta_{ri}\sin\alpha, -\sin\theta_{ri}\sin\alpha, \cos\alpha)^T, \\ \quad \text{when the incident surface is inclined} \end{cases}$$

Where $\theta_n$ is the rotation angle of the ith prism, $\alpha$ is the wedge angle of the prism.

The steps of this reverse lookup-table method are as follows:

Taking the unit vector of the current emergent beam in the rotation optical components as the target emergent beam, then search the lookup table to find the emergent beam closest to the target emergent beam, the error between them is given by, $$\Delta = \sqrt{(X_{rp}-x_{rp})^2+(Y_{rp}-y_{rp})^2+(Z_{rp}-z_{rp})^2}$$

Where $X_{rp}$, $Y_{rp}$ and $Z_{rp}$ are the coordinates of the unit vector of the emergent beam recorded in the lookup table, and $x_{rp}$, $y_{rp}$ and $z_{rp}$ are the coordinates of the unit vector of the current emergent beam of prism. Then the rotation angles can be determined according to the found emergent beam.

Compared with the prior technologies, this invention has the following advantages:
1. The measurement method of this invention realizes a dynamic real-time measurement of 6 DOF for the tested object by adjusting the rotation angles of two rotation optical components in real time. In the process of measurement, only the target is fixed on the tested object, and the structure of the target is simple. Therefore, the measurement method proposed by this invention has little influence on the actual operation of the object and is convenient to use. Meanwhile, the test method of this invention simplifies the calculation process of 6 DOF measurement and improves the real-time and reliability of the measurement method.
2. This invention adopts a non-contact measurement and has strong adaptability to the measured object.
3. The measuring system has the advantages of simple structure, small volume, easy carrying and low cost.

BRIEF DESCRIPTION OF THE DRAWINGS

Referring now to the drawings, exemplary embodiments are shown which should not be construed to be limiting regarding the scope of the disclosure, and wherein the elements are numbered alike in several FIGURES.

REFERENCE NUMBERS

100, tracking measurement device; 101, processor; 102, camera; 1021, camera photosensitive chip; 1022, camera lens; 103, filter; 104, driving unit; 105, transmission unit; 106, angle measuring unit; 107, prism; 108, camera boresight; 109, adjusted camera boresight; 1080, camera imaging FOV; 1081, combined imaging FOV; 1082, optical scanning field; 200, target; 201, marker ring; 2011, marker; 2011A, first marker; 2011B, second marker; 2011C, third marker; 2012, marking shaft; 2013, sleeve ring; 202, sleeve I; 203, fixed support; 300, tested object; 301, sleeve II; 302, needle; 400, hole-based target; 401, top marker I; 402, pillar I; 403, sleeve III; 405, plug pin; 500, shaft-based target; 501, top marker II; 502, pillar II; 503, sleeve IV; 504, scroll chuck; 600, flexible multi-hinge; 601, base I; 602, rotary column I; 603, damper; 604, hinge rod; 605, probe; 700, scanner; 701, base II; 702, rotary column II; 703, scanning head.

DETAILED DESCRIPTION OF THE PREFERRED EMBODIMENTS

This invention is described in detail below with the drawings and specific embodiments. Based on the technical scheme of this invention, detailed implementation methods and specific operation procedures are given in the following embodiments. However, the protection range of this invention is not limited to these embodiments.

Figure 1:
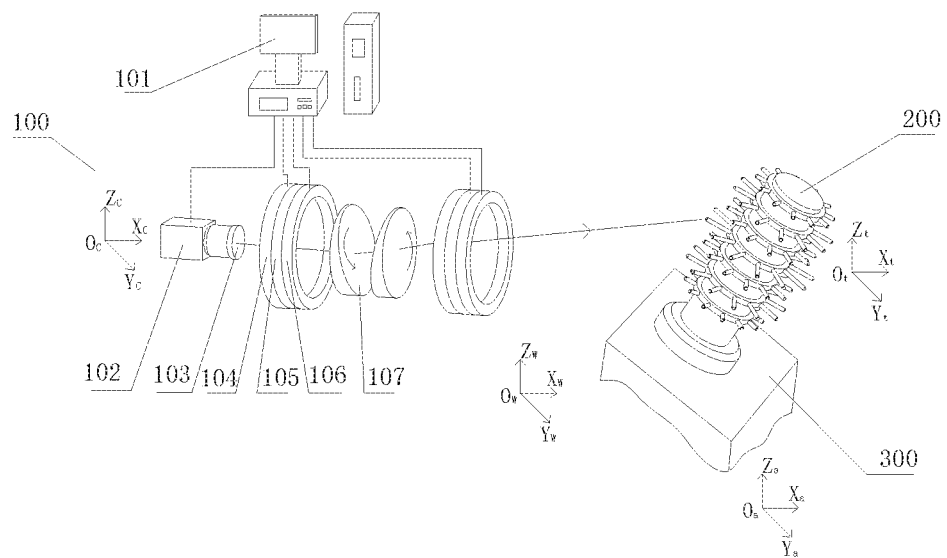
FIG. 1 is a perspective view of an exemplary 6 DOF measuring device and system.
Figure 2:
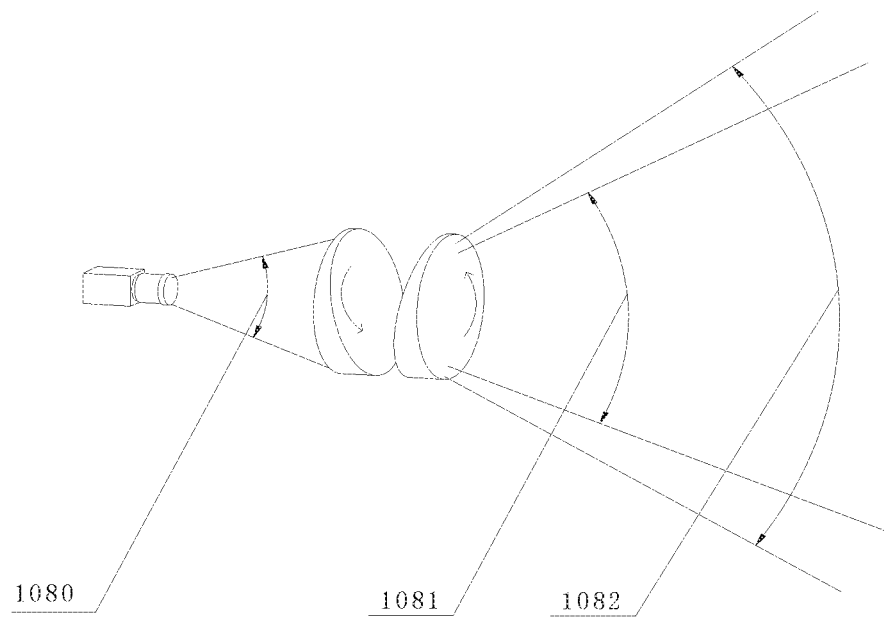
FIG. 2 illustrates the field of view (FOV) of the camera, the prism and the combination FOV of the camera and the prism.

This embodiment provides a 6 DOF measurement system and method. As shown in FIG. 1 and FIG. 2, the measurement system includes a tracking measurement device 100 and a target 200. The tracking measurement device 100 includes a camera 102 and two rotation optical components. The camera 102 and the two rotation optical components are connected to a processor 101 respectively. The camera 102 and the two rotation optical components are arranged in sequence, and the boresight of the camera 102 and the optical axis of the two rotation optical components remain coaxial. Each rotation optical component can rotate independently, and the boresight of the camera 102 and the optical axis of the two rotation optical components remain coaxial.

Figure 3:
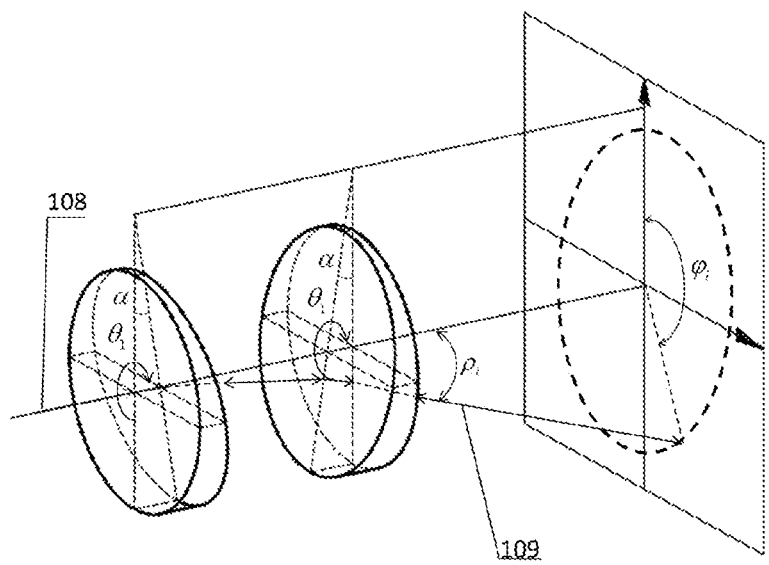
FIG. 3 illustrates the adjustment of the camera boresight.
Figure 4:
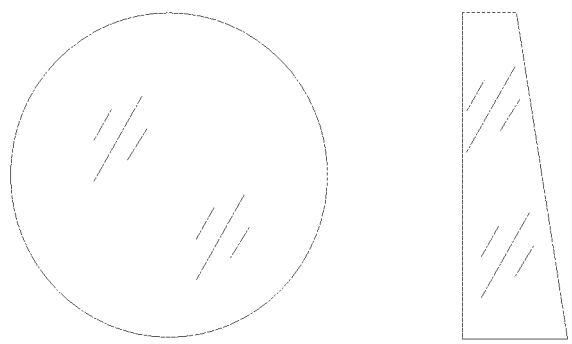
FIG. 4 illustrates the structure of the prism.

As shown in FIG. 3, each rotation optical component can rotate independently. The camera boresight 108 is refracted by the first prism 107, and the adjusted camera boresight 109 is obtained after the camera boresight 108 is refracted again by the second prism 107. With the rotation of the first prism 107 and the second prism 107, the adjusted camera boresight 109 with different directions can be obtained. The rotation optical component includes a driving unit 104, a transmission unit 105, an angle measuring unit 106 and a prism 107. As shown in FIG. 4, the cross section of prism 107 is a right trapezoid. The angle measuring device 106 and the prism 107 are all mounted on the transmission unit 105. The driving unit 104 is connected to the transmission unit 105, and the processor 101 is connected to the driving unit 104. The optical scanning field 1082 formed by two rotation optical components is not less than the camera imaging FOV 1080, and the combined imaging FOV 1081 formed by camera 102 and two rotation optical components is not less than the camera imaging FOV 1080. And a filter 103 is arranged between the camera 102 and the rotation optical components.

The transmission unit 105 can adopt either gear transmission, worm gear transmission, synchronous belt transmission or chain transmission. The prism 107 can use different refractive index optical transmission materials, such as optical glass, optical crystals, optical plastics (such as PC, PMMA, etc.), ceramics and metals, any one or several. The driving unit 104 can use either servo motors, stepping motors or torque motors.

Figure 5:
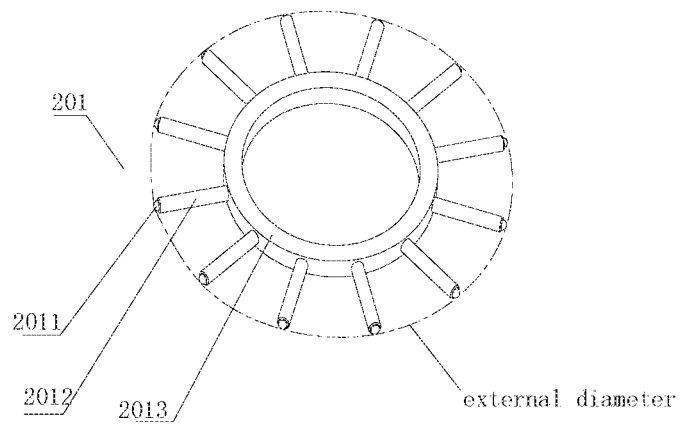
FIG. 5 is a perspective view of an exemplary marking ring.

As shown in FIG. 1 and FIG. 5, a target 200 comprising: a sleeve and marking rings 201 which include marking shafts 2012 and rings 2013. The rings 2013 are nested on the outer diameter of the sleeve. The marking shafts 2012 are radially distributed on the outer of each ring 2013, and the markers 2011 are set at the hanging end of the marking shafts 2012. The target 200 is mounted on the tested object, and at least three markers 2011 with known distance constraints are on the target 200. In addition, at least one marker 2011 does not coincide with the midpoint of the line connecting any two of the remaining markers 2011. And the markers 2011 are spherical infrared light emitting diode (LED). In this embodiment, target 200 is fixed with the first marker 2011A, the second marker 2011B and the third marker 2011C. The distance between the first marker 2011A and the second marker 2011B is 30 mm, the distance between the second marker 2011B and the third marker 2011C is 40 mm, and the distance between the first marker 2011A and the third marker 2011C is 55 mm. Target 200 is fixed on the object 300.

Figure 6:
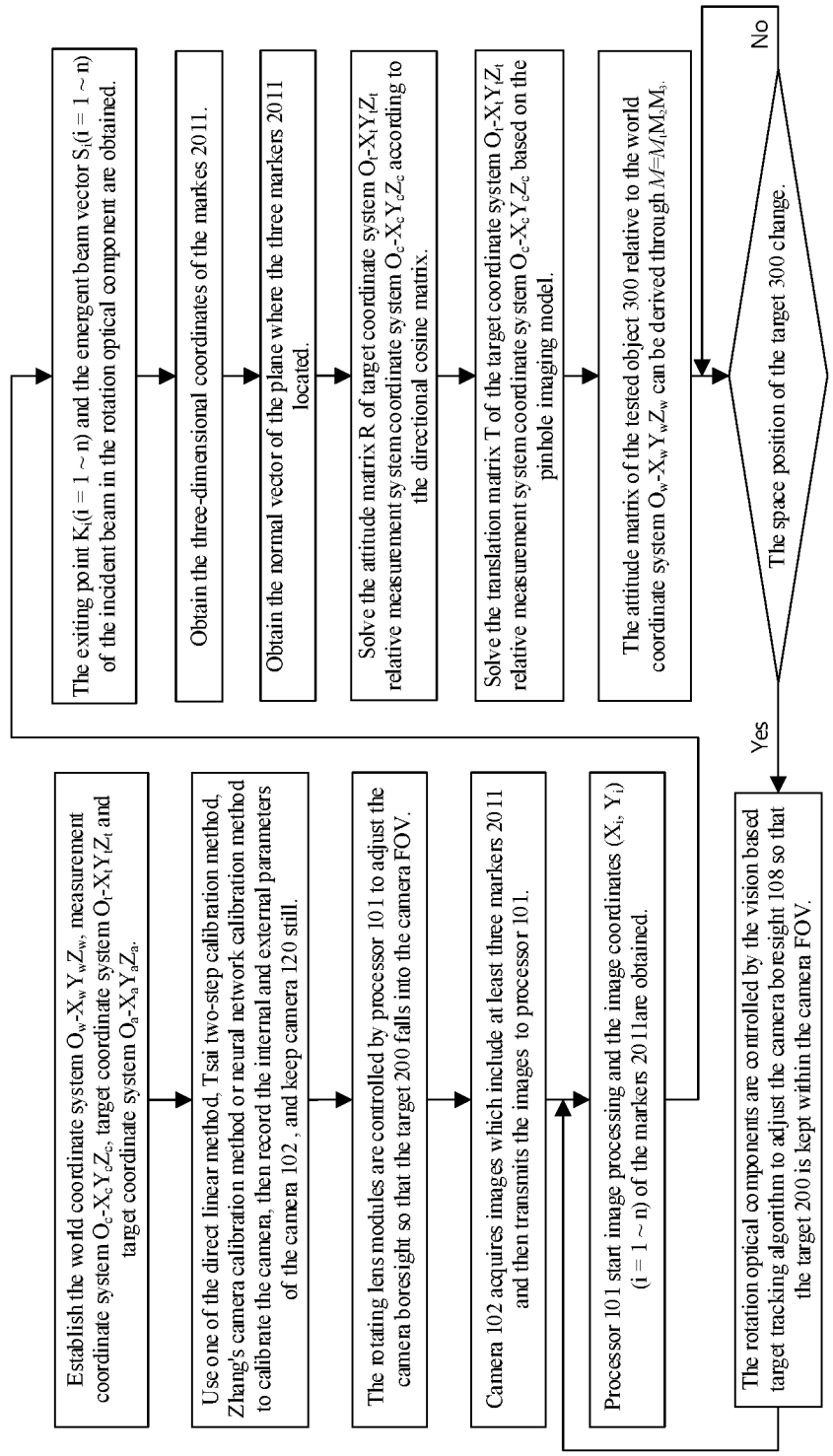
FIG. 6 illustrates the exemplary steps of this measurement method.

As shown in FIG. 6, the 6 DOF measuring method comprising:

1) Establish the world coordinate system $O_w$-$X_w Y_w Z_w$, camera coordinate system $O_c$-$X_c Y_c Z_c$, target coordinate system $O_t$-$X_t Y_t Z_t$ and tested object coordinate system $O_a$-$X_a Y_a Z_a$.

2) A suitable calibration method is used to calibrate the camera. The calibration methods include direct linear method, Tsai two-step calibration method, Zhang's camera calibration method or neural network calibration method. The internal and external parameters of the camera 102 are recorded, and the camera 102 is kept still during the measurement process.

3) The rotation optical components are controlled by processor 101 to adjust the camera boresight so that the target 200 falls into the camera FOV.

4) Camera 102 acquires images which include the first marker 2011A, the second marker 2011B, and the third marker 2011C, then the images are transmitted to processor 101.

5) Processor 101 acquires the images and then performs image processing. The image coordinates of the first marker 2011A, the second marker 2011B and the third marker 2011C are (−0.462, 0), (0, 0), (0, 0.616).

Figure 7:
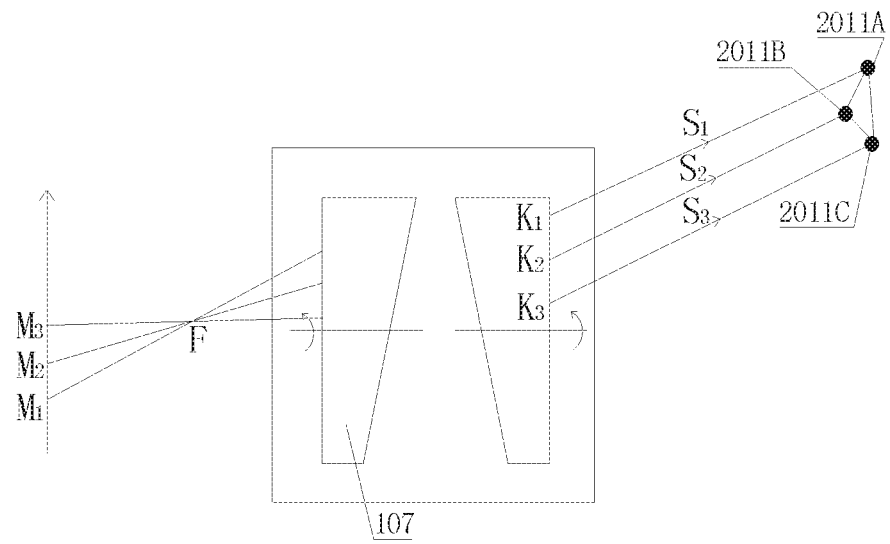
FIG. 7 illustrates the principle of this measurement method.

6) As shown in FIG. 7, M1, M2, and M3 are the image points corresponding to the first marker 2011A, the second marker 2011B, and the third marker 2011C, taking the lines that connecting the image points $M_1$, $M_2$, and $M_3$ with the focus F of the camera 102 as the three incident beams. Due to the rotation angles of the rotation optical components were known, the exiting points K1, K2, and K3 and the emergent beam vectors S1, S2, and S3 of the incident beams in the rotation optical components are obtained through the vector refraction theorem. And in the camera coordinate system, the coordinates of K1 are (−1.471, −2.616, 33) and the vector S1 is (0.0244, −0.0486, 0.9985). Similarly, the coordinates of exiting points K2 and K3 are (−0.6514, −2.1373, 33) and (−0.6311, −1.043, 33), and the vectors S2 and S3 are (0.0528, −0.0456, 0.997) and (0.0526, −0.0095, 0.9986).

7) According to the following equation, the three-dimensional coordinates of the marker 2011 can be obtained.

$$\begin{cases} \begin{bmatrix} X_{pi} \\ Y_{pi} \\ Z_{pi} \end{bmatrix} = \begin{bmatrix} X_{ki} \\ Y_{ki} \\ Z_{ki} \end{bmatrix} + \lambda_i \begin{bmatrix} X_{si} \\ Y_{si} \\ Z_{si} \end{bmatrix} \\ (X_{pi} - X_{pj})^2 + (Y_{pi} - Y_{pj})^2 + (Z_{pi} - Z_{pj})^2 = D_{ij}^2, i < j \end{cases}$$

Where, $X_{pi}$, $Y_{pi}$ and $Z_{pi}$ are the three-dimensional coordinates of the marker i in the camera coordinate system $O_c$-$X_c Y_c Z_c$ in the measurement system; $X_{ki}$, $Y_{ki}$ and $Z_{ki}$ are the three-dimensional coordinates of $K_i$ in the camera coordinate system $O_c$-$X_c Y_c Z_c$ in the measurement system; $X_{si}$, $Y_{si}$ and $Z_{si}$ are the three-dimensional coordinates of $S_i$ in the camera coordinate system $O_c$-$X_c Y_c Z_c$ in the measurement system, i=1~3; $X_{pj}$, $Y_{pj}$, $Z_{pj}$ are the three-dimensional coordinates of the marker j in the measuring coordinate system $O_c$-$X_c Y_c Z_c$ in the measurement system, j=1~3. $D_{ij}$ is the distance between the marker i and the marker j, and $\lambda_i$ is the proportional coefficient of the equation i.

In the camera coordinate system $O_c$-$X_c Y_c Z_c$, the three-dimensional coordinates of the first marker 2011A, the second marker 2011B and the third marker 2011C are (22.36, −49.63, 1008.2), (50.5, −46.3, 998.3) and (49.32, −10.0651, 981.3).

8) The normal vector of the plane where the three markers 2011 are located can be solved by the following formula:

$$\vec{N} = \overrightarrow{P_1 P_2} \times \overrightarrow{P_2 P_3}$$

Where $P_1$ is the first marker, $P_2$ is the second marker, $P_3$ is the third marker, N is the normal vector of the plane where the first marker, the second marker and the third marker are located. The normal vector N is (301.8, 489.1, 1021.6). Then, the vector perpendicular to $\overrightarrow{P_1 P_2}$ in the plane where the three markers are located, namely vector $\vec{N'}$, are obtained. Taking $P_2$ as the origin and the orientation vectors of $\overrightarrow{P_1 P_2}$, $\vec{N}$ and $\vec{N'}$ as the coordinate directions, the coordinate system is established, and the target coordinate system $O_t$-$X_t Y_t Z_t$ coincides with this coordinate system.

9) The attitude matrix R of the target coordinate system $O_t$-$X_t Y_t Z_t$ relative to the camera coordinate system $O_c$-$X_c Y_c Z_c$ is solved by the directional cosine matrix.

Optimized, the directional cosine matrix is $$\begin{bmatrix} \cos(I,i) & \cos(J,i) & \cos(K,i) \\ \cos(I,j) & \cos(J,j) & \cos(K,j) \\ \cos(I,k) & \cos(J,k) & \cos(K,k) \end{bmatrix},$$

where i, j and k are the unit directional vectors of the target coordinate system $O_t$-$X_tY_tZ_t$, and I, J and K are the unit directional vectors of the camera coordinate system $O_c$-$X_cY_cZ_c$. The value of each element in the direction cosine matrix is the cosine value of the angle between the two unit directional vectors.

$$R = \begin{bmatrix} -0.029 & 0.938 & 0.258 \\ 0.906 & 0.114 & 0.417 \\ -0.425 & -0.330 & 0.872 \end{bmatrix}$$

10) According to the image coordinates of the first marker 2011A, the second marker 2011B, and the third marker 2011C and based on the pinhole imaging model, the translation matrix T of the target coordinate system $O_t$-$X_tY_tZ_t$ relative to camera coordinate system $O_c$-$X_cY_cZ_c$ can be solved.

$T=[50.5 -46.3\ 998.3]$

11) The attitude matrix of the object 300 relative to the world coordinate system $O_w$-$X_wY_wZ_w$ can be derived according to the following equation.

$M=M_1M_2M_3$ where $M_1$ is the conversion matrix of the camera 102 relative to the world coordinate system $O_w$-$X_wY_wZ_w$, $$M_2 = \begin{bmatrix} R & T \\ 0 & 1 \end{bmatrix},$$

$M_3$ is the pose conversion matrix of the tested object coordinate system $O_a$-$X_aY_aZ_a$ relative to the target coordinate system $O_t$-$X_tY_tZ_t$. Considering that the world coordinate system of the object $O_w$-$X_wY_wZ_w$ coincide with the camera coordinate system $O_c$-$X_cY_cZ_c$ and the target coordinate system $O_t$-$X_tY_tZ_t$ coincide with the tested object coordinate system $O_a$-$X_aY_aZ_a$, the conversion matrix of the object 300 relative to the world coordinate system $O_w$-$X_wY_wZ_w$ can be calculated as follows:

$$\begin{bmatrix} -0.029 & 0.938 & 0.258 & 50.5 \\ 0.906 & 0.114 & 0.417 & -46.3 \\ -0.425 & -0.330 & 0.872 & 998.3 \end{bmatrix}$$

12) When the tested object is moving, the rotation optical components are controlled by the visual tracking algorithm to adjust the boresight 108 of camera 102 so that the target 200 is kept within the camera FOV, then repeat the steps 4 to 11.

Optimally, the principle of the visual tracking algorithm is as follow: Firstly, taking the line that connecting any markers 2011 in the imaging coordinate system with the focus F of camera 102 as the incident beam. Then due to the rotation angles of the rotation optical components are known, the emergent beam vector of the rotation optical component is obtained through the vector ray tracing method. Finally, under the condition that the emergent beam vector is known, the rotation angles of the rotation optical components are acquired through a reverse lookup-table method.

The steps to make a lookup table of the reverse lookup-table method are as follows: First, the rotation step angle $\theta_{st}$ of the prism 107 is decided, in this embodiment, $\theta_{st}=0.1°$. Every revolution of the prism 107 rotation can be further divided into $360°/\theta_{st}$ steps. Then emergent beam vectors at different angles are calculated according to the following equation and the lookup table of the relationship between the rotation angles and the unit vector of the emergent beam is established.

$$A_{out} = \frac{n_1}{n_2}A_{in} + \left\{\sqrt{1-\left(\frac{n_1}{n_2}\right)^2[1-(A_{in}\cdot N)^2]} - \frac{n_1}{n_2}(A_{in}\cdot N)\right\}N$$

Where $A_{in}$ is the unit vector of the incident beam, $A_{out}$ is the unit vector of refraction light; N is the normal vector of refracting surface; $n_1$ is the refractive index of an incident medium and $n_2$ is the refractive index of the emergent medium.

$$N = \begin{cases} (0, 0, 1), \text{ when the incident surface} \\ \quad\text{or the emergent surface is vertical} \\ (\cos\theta_{ri}\sin\alpha, \sin\theta_{ri}\sin\alpha, \cos\alpha)^T, \\ \quad\text{when the emergent surface is inclined} \\ (-\cos\theta_{ri}\sin\alpha, -\sin\theta_{ri}\sin\alpha, \cos\alpha)^T, \\ \quad\text{when the incident surface is inclined} \end{cases}$$

where, $\theta_{ri}$ is the rotation angle of the ith prism 107, $\alpha$ is the wedge angle of the prism 107.

The steps of this reverse lookup-table method are:

Taking the unit vector of the current emergent beam in the rotation optical components as the target emergent beam, then search the lookup table to find the emergent beam closest to the target emergent beam, the error between them is given by, $$\Delta = \sqrt{(X_{rp}-x_{rp})^2+(Y_{rp}-y_{rp})^2+(Z_{rp}-z_{rp})^2}$$

where, $X_{rp}$, $Y_{rp}$ and $Z_{rp}$ are the coordinates of the unit vector of the emergent beam recorded in the lookup table, and $x_{rp}$, $y_{rp}$ and $z_{rp}$ are the coordinates of the unit vector of the current emergent beam of prism 107. Then the rotation angles can be determined according to the found emergent beam.

The working principles of this embodiment are as follows: the pose matrix of target 200 in camera coordinate system $O_c$-$X_cY_cZ_c$ is obtained by the 6 DOF measurement method, and then according to the pose conversion matrix of the $O_c$-$X_cY_cZ_c$ camera coordinate system relative to the world coordinate system $O_w$-$X_wY_wZ_w$ and the pose conversion matrix of the tested object coordinate system $O_a$-$X_aY_aZ_a$ relative to the target coordinate system $O_t$-$X_tY_tZ_t$, the pose conversion matrix of the target 300 relative to the world coordinate system $O_w$-$X_wY_wZ_w$ is obtained. The driving unit 104 is controlled by processor 101 through the visual tracking algorithm. Then, the driving unit 104 drives the prism 107 through the transmission unit 105 to adjust the boresight of camera 102, so as to track the target 200 and realize a real-time dynamic measurement of tested object 300.

Accuracy Analysis

Figure 8:
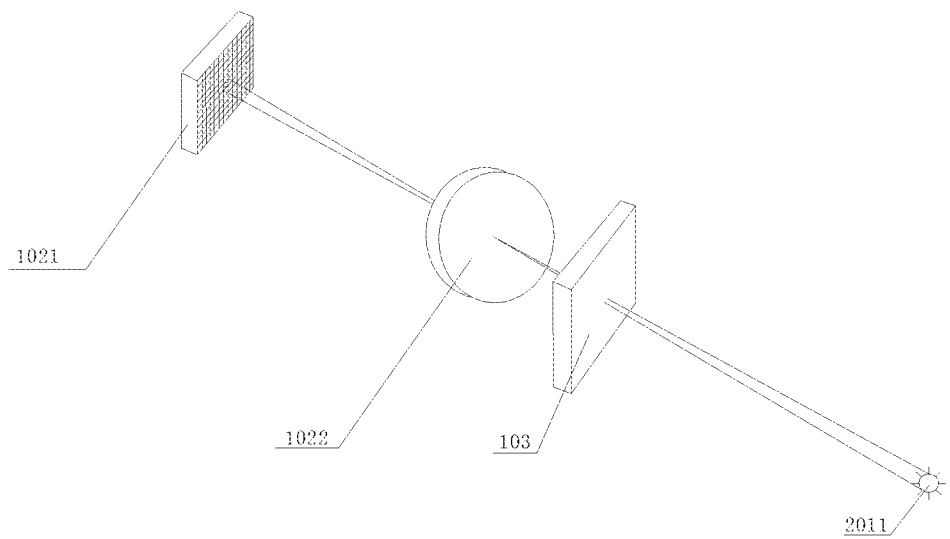
FIG. 8 illustrates the analysis of the measurement accuracy.

In order to meet the demand of high accuracy of this 6 DOF measurement system, the following conditions should be satisfied: 1) The harmful band light is filtered by filter 103; 2) Camera lens 1022 is of good quality and the image distortion can be corrected; 3) The system error of camera is removed through error compensation method; 4) The image of the marker 2011 in the camera photosensitive chip 1021 should be completely filled in the area with a radius of 1000 pixels. FIG. 8 illustrates the process of the measurement accuracy analysis. Suppose that S is the distance between the camera lens 1022 and the marker 2011, f is the focal length of the camera 102, D is the maximum shape size of the marker 2011, and N is the number of pixels when the size of marker 2011 is the largest. The relationship between S, f, D and N can be described as:

$$\frac{S}{D} = \frac{f}{N}$$

Therefore, the measurement accuracy can be determined by the following equation:

$$|dS| = \frac{f}{N}|dD|$$

Where dD is the machining error of the marker 2011. Assuming that N=1000, the pixel size is 4.4 μm×4.4 μm, dD=0.001 mm and f=16 mm, it can be calculated that dS=3.6 μm, which indicates that the measurement accuracy can reach 3.6 μm. With the increase of measurement distance, f increases and the measurement accuracy decreases.

Figure 9:
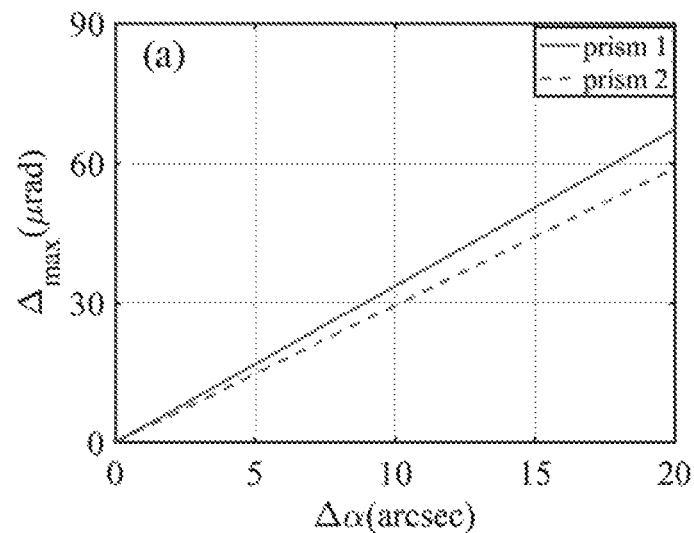
FIG. 9 illustrates the relation between the direction error of the camera boresight and the wedge angle error of the prism.
Figure 10:
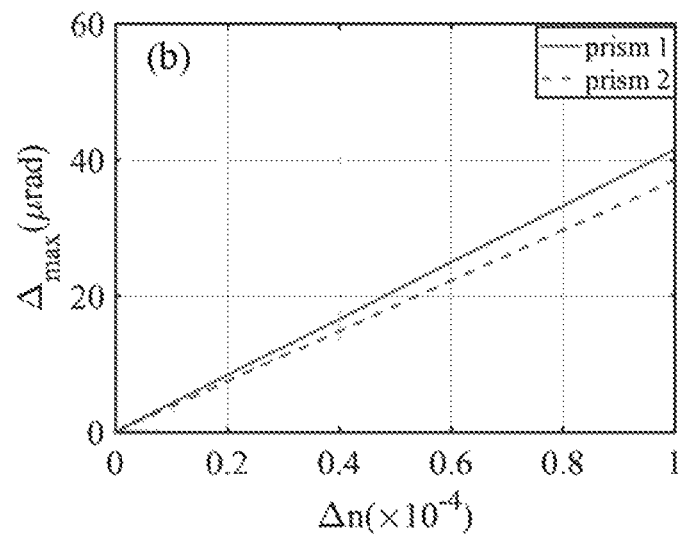
FIG. 10 illustrates the relation between the direction error of the camera boresight and the refractive index error of the prism.

The measurement method and tracking strategy of the system in this embodiment are mainly realized by the combination of processor, driving unit, transmission unit, angle measuring device and prism. The machining error and assembly error of prisms mainly affect the pointing accuracy of camera boresight. Assuming that the wedge angle errors of two prisms are $\Delta\alpha_1$ and $\Delta\alpha_2$, the actual wedge angles of the two prisms are $\alpha+\Delta\alpha_1$ and $\alpha+\Delta\alpha_2$, respectively; the refractive index errors of the prisms are $\Delta n_1$ and $\Delta n_2$, the actual refractive index of the two prisms are $n+\Delta n_1$ and $n+\Delta n_2$. Providing that $\alpha$=20, and n=1.517, the relationship of the maximum pointing error $\Delta_{max}$ within the pointing range of camera boresight vary with the wedge angle error $\Delta\alpha$ and the refractive index error $\Delta n$ is shown in FIG. 9 and FIG. 10, respectively. Obviously, for both prisms, the pointing error of camera boresight increases with the increase of wedge angle error and refractive index error.

Figure 11A:
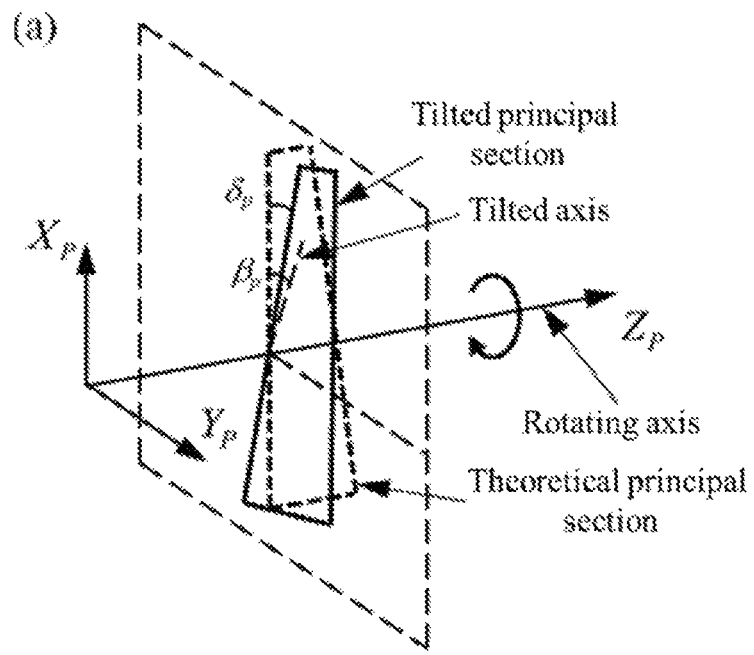
FIG. 11A illustrates the prism assembly error.
Figure 11B:
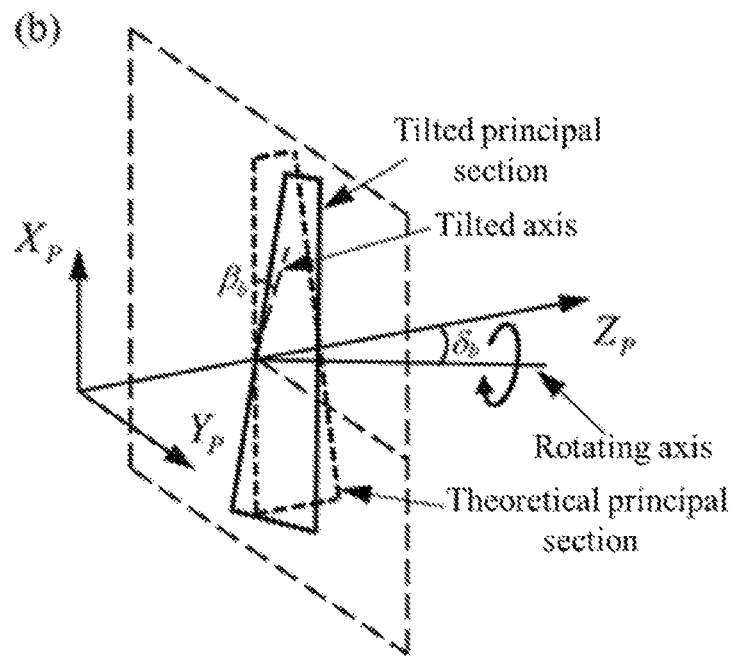
FIG. 11B illustrates the bearing inclination error.
Figure 12:
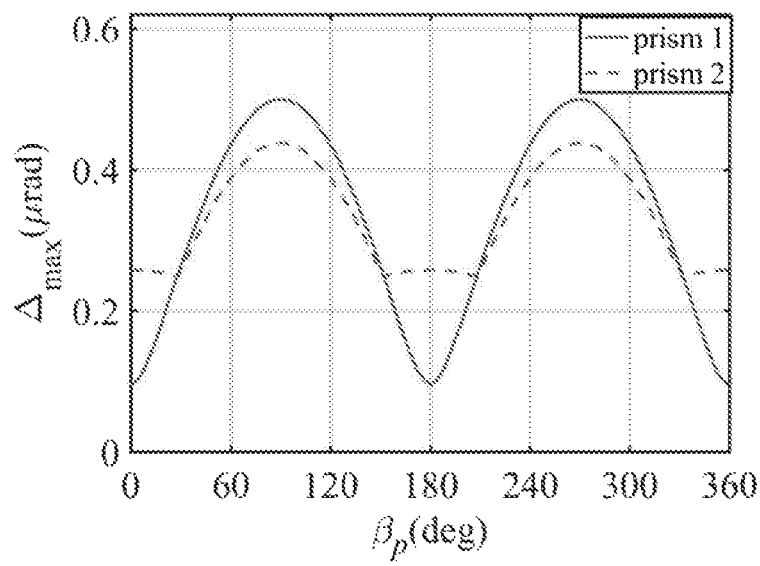
FIG. 12 illustrates the relationship between the camera boresight pointing error and the tilt angle of the tilting axis of the prism.
Figure 13:
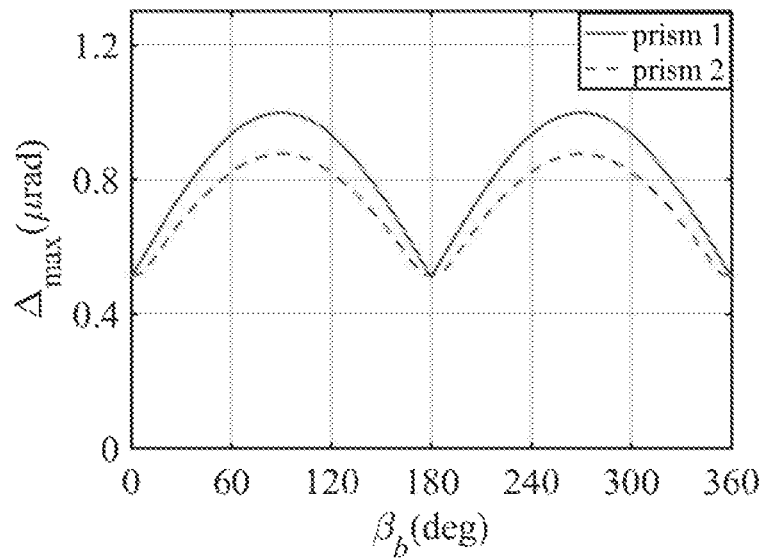
FIG. 13 illustrates the relationship between the camera boresight pointing error and the tilt angle of the tilting axis of the bearing.

Prism assembly errors directly affect the camera boresight pointing accuracy. According to the error form, assembly errors of the prism can be divided to the prism tilt errors and bearing tilt errors, as shown in FIG. 11a and FIG. 11b. The prism tilt deviation can be represented by the tilt angle $\beta_p$ of the axis of prism and the tilt error $\delta_p$ of prism, and the bearing tilt deviation can be represented by the tilt angle $\beta_b$ of the axis of bearing and the tilt error $\delta_b$ of bearing. The tilting axis of the prism and the bearing can be expressed as $U_1=(\cos\beta_p, \sin\beta_p, 0)^T$ and $U_2=(\sin\beta_b \sin\delta_b, \cos\beta_b \sin\delta_b, \cos\delta_b)^T$ respectively. According to the Rodrigues rotation formula and the vector refraction theorem, the the camera boresight pointing error can be calculated. Assuming that the geometrical parameters of each prism are wedge angle $\alpha$=20°, refractive index n=1.517, the tilt angle $\beta_p$ and $\beta_b$ are within the range of [0°, 360°], and the tilt error $\delta_p=\delta_b=1''$. FIG. 12 shows the relationship between the maximum pointing errors $\Delta_{max}$ and the tilt angle $\beta_p$, it can be seen that $\Delta_{max}$ attains the maximum value, which is 0.499 μrad and 0.437 μrad, when $\beta_p$=90° or 270°. And FIG. 13 shows the relationship between the maximum pointing errors $\Delta_{max}$ and the bearing tilt angle $\beta_b$, it can be seen that $\Delta_{max}$ attains the maximum value, which is 0.998 μrad and 0.874 μrad, when $\beta_b$=90° or 270°.

In different embodiments, the target may also have the following forms.

Figure 14:
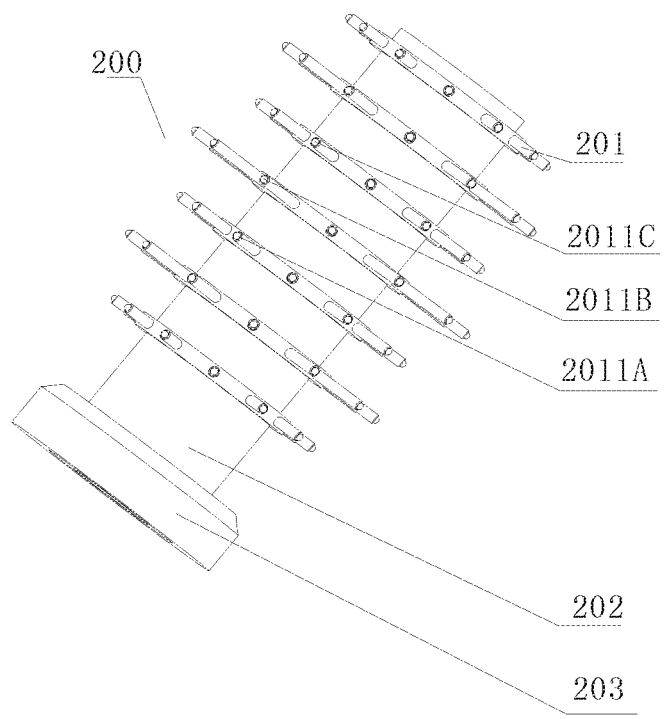
FIG. 14 illustrates the structure of an exemplary target.
Figure 15:
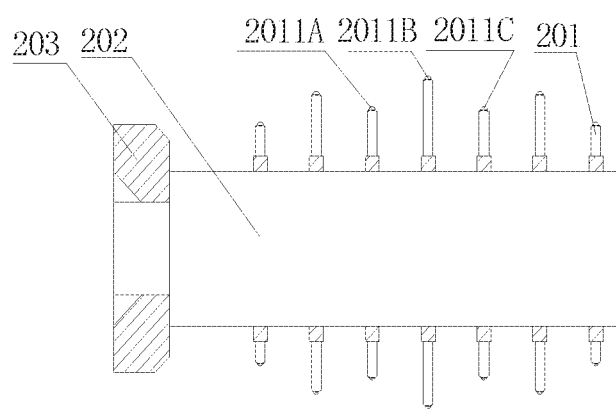
FIG. 15 is a cutaway view of a front view of an exemplary target.
Figure 16:
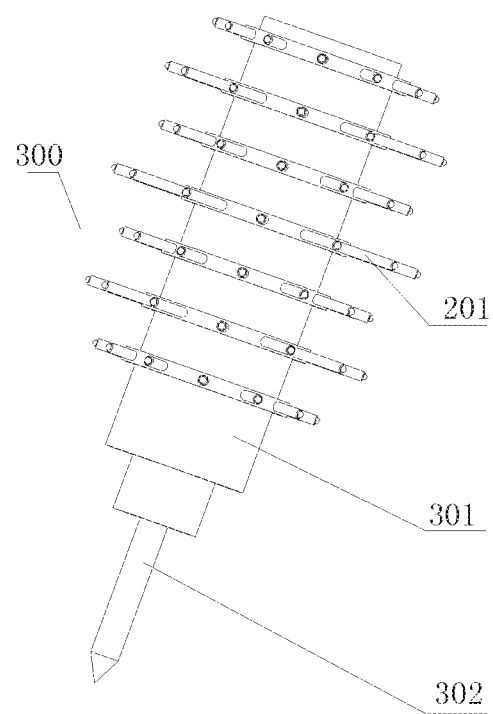
FIG. 16 illustrates the structure of an exemplary probe.
Figure 17:
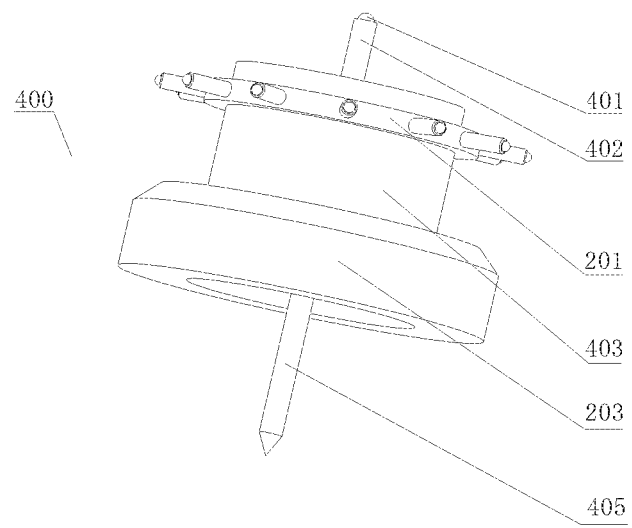
FIG. 17 is a perspective view of an exemplary hole-based target.
Figure 18:
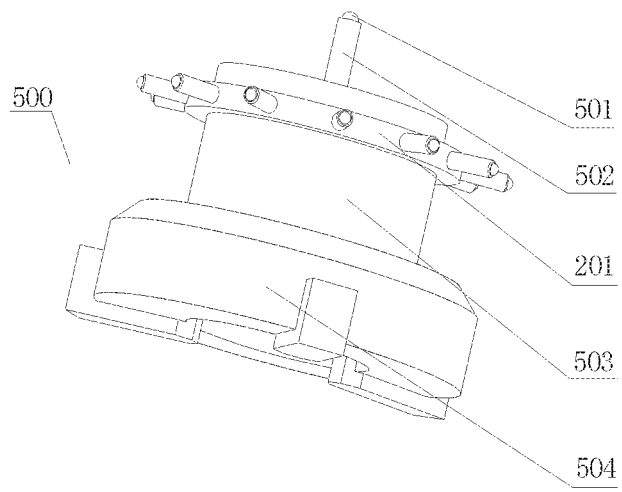
FIG. 18 is a perspective view of an exemplary shaft-based target.
Figure 19:
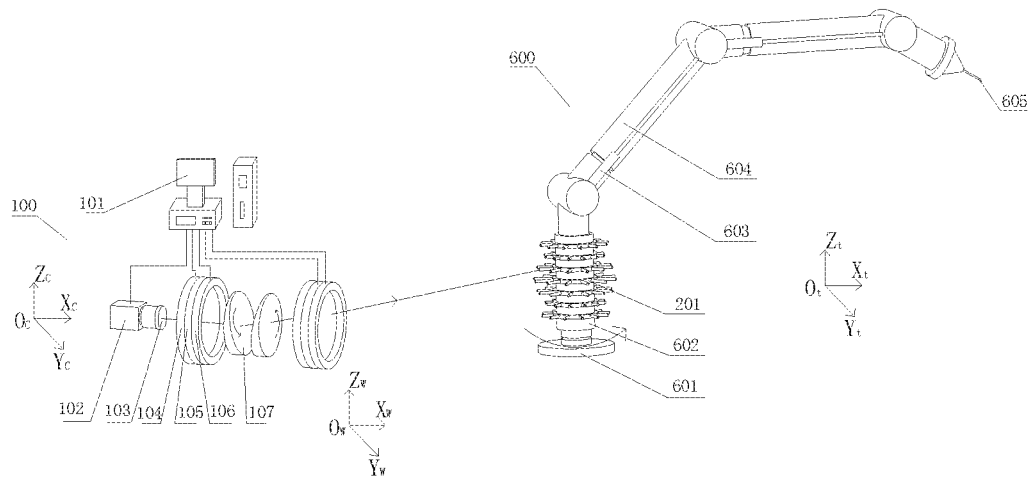
FIG. 19 is a perspective view of an exemplary flexible multi-hinge measuring system.
Figure 20:
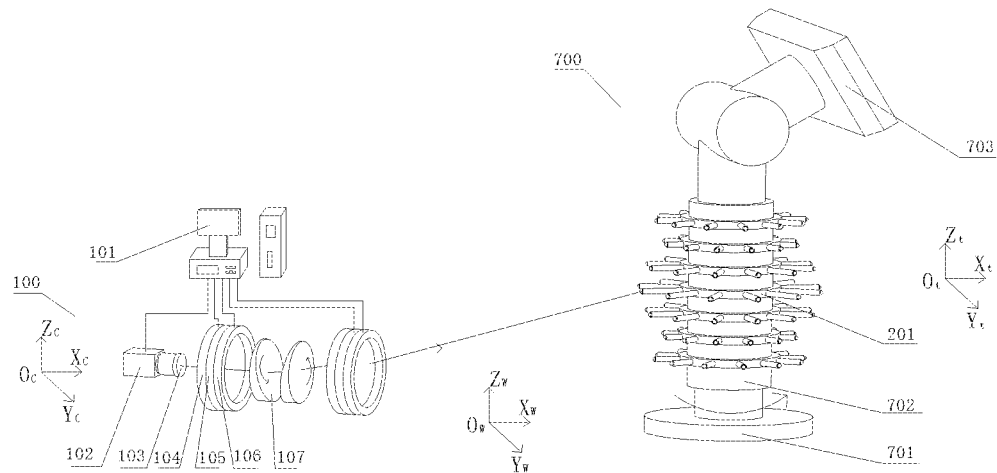
FIG. 20 is a perspective view of an exemplary scanner measuring system.

1. As shown in FIG. 14 and FIG. 15, the target 200 comprising: a sleeve I 202 is fixed on a fixed support 203; at least three marking rings 201 are installed on the sleeve I 202, and the outer diameter of at least one marking ring 201 of three adjacent marking rings 201 is not equal to that of the other marking rings 201.
2. As shown in FIG. 16, a probe 300 is another arrangement of target 200. The probe 300 comprising: at least three marking rings 201 are fitted on a sleeve II 301, and the outer diameter of at least one of the three adjacent marking rings 201 is not equal to that of the other two marking rings 201; a needle 302 is fixed at the bottom of the sleeve 11301. The other components, connection relations and measurement methods are the same as those of the above specific embodiments.
3. As shown in FIG. 17, a hole-based target 400 is another arrangement of the target 200. The hole-based target 400 comprising: a pillar I 402 is fixed on the top of a sleeve III 403, and at least one marking ring 201 is fixed on the sleeve III 403; a top marker I 401 is fixed on the top of the pillar I 402; a fixed support 203 is fixed on the bottom of the sleeve III 403, and the fixed support 203 is a magnetic chuck or a negative sucker; a plug pin 405 is fixed on the middle of the fixed support 203. The other components, connection relations and measurement methods are the same as those of the above specific embodiments.
4. As shown in FIG. 18, a shaft-based target 500 is another arrangement of the target 200. The shaft-based target 500 comprising: a pillar II 502 is fixed on a sleeve IV 503; a top marker II 501 is fixed on the top of pillar II 502; at least one marking ring 201 is installed on the sleeve IV 503; a scroll chuck 504 is fixed on the bottom of the sleeve IV 503. The other components, connection relations and measurement methods are the same as those of the above specific embodiments.
5. As shown in FIG. 19, a flexible multi-hinge 600 is another arrangement of the target 200. The flexible multi-hinge 600 comprising: a rotary column I 602 is rotationally connected with a base I 601; at least three marking rings 201 are installed on the rotary column I 602, and the outer diameter of at least one marking ring 201 of three adjacent marking rings 201 is not equal to that of the other two marking rings 201; several hinge rods 604 are hinged at the head and tail, the hinge rods 604 are directly fixed with dampers 603, and the head of the first hinge rod 604 is hinged with the rotary column I 602; a probe 605 is connected with the end of the last hinge rod 604. The other components, connection relations and measurement methods are the same as those of the above specific embodiments.
6. As shown in FIG. 20, a scanner 700 is another arrangement of the target 200. The scanner 700 comprising: a rotary column II 702 is rotationally connected with a base II 701, at least three marking rings 201 are installed on the rotary column II 702, and the outer diameter of at least one marking ring 201 in three adjacent marking rings 201 is not equal to that of the other two marking rings 201; a scanning head 703 is articulated with the rotary column II 702. The other components, connection relations and measurement methods are the same as those of the above specific embodiments.

The preferred specific embodiments of this invention are described in detail. The ordinary technicians in related field can make many modifications and changes according to the concept of this invention without creative work. Therefore, any technical scheme that can be obtained through logical analysis, reasoning or limited experiments on the basis of the existing technology in accordance with this invention shall be within the protect range determined by these claims.

What is claimed is:

1. A 6 DOF measuring system comprising:
   a tracking measurement device comprising:
   a processor;
   a camera connected to the processor;
   two rotation optical components connected to the processor, and the camera and two rotation optical components are arranged in sequence, and the boresight of the camera and the optical axis of the two rotation optical components remain coaxial, and each rotation optical component can rotate independently;
   a target mounted on a tested object, which contains at least three markers with known distance constraints, and at least one marker does not coincide with the midpoint of the line connecting any two of the remaining markers,
   the processor is configured to perform a 6 DOF measuring method, the 6 DOF measuring method comprising:
   1) establishing a world coordinate system $O_w\text{-}X_wY_wZ_w$, camera coordinate system $O_c\text{-}X_cY_cZ_c$, target coordinate system $O_t\text{-}X_tY_tZ_t$ and tested object coordinate system $O_a\text{-}X_aY_aZ_a$;
   2) calibrating the camera to obtain the internal and external parameters of the camera;
   3) the rotation optical components are controlled by the processor to adjust the camera boresight so that the target falls into the camera FOV;
   4) the camera acquires images which include at least three markers, and then the image processing is carried out, and the image coordinates $(X_i, Y_i)$ (i=1~n) of the markers are obtained;
   6) according to a reverse ray tracing method and the rotation angles of the rotation optical components, the exiting point $K_i$(i=1~n) and the emergent beam vector $S_i$(i=1~n) of the incident beam in the rotation optical component are obtained;
   7) three-dimensional coordinates of the markers can be obtained according to the following equation;

$$\begin{bmatrix} X_{pi} \\ Y_{pi} \\ Z_{pi} \end{bmatrix} = \begin{bmatrix} X_{ki} \\ Y_{ki} \\ Z_{ki} \end{bmatrix} + \lambda_i \begin{bmatrix} X_{si} \\ Y_{si} \\ Z_{si} \end{bmatrix}$$

$$(X_{pi} - X_{pj})^2 + (Y_{pi} - Y_{pj})^2 + (Z_{pi} - Z_{pj})^2 = D_{ij}^2, i < j$$

where, $X_{pi}$, $Y_{pi}$, and $Z_{pi}$ are the three-dimensional coordinates of the marker i in the camera coordinate system $O_c\text{-}X_cY_cZ_c$ of the measurement system; $X_{ki}$, $Y_{ki}$, and $Z_{ki}$ are the three-dimensional coordinates of $K_i$ in the camera coordinate system $O_c\text{-}X_cY_cZ_c$ of the measurement system; $X_{si}$, $Y_{si}$, and $Z_{si}$ are the three-dimensional coordinates of $S_i$ in the camera coordinate system $O_c\text{-}X_cY_cZ_c$ of the measurement system, i=1~n; $X_{pj}$, $Y_{pj}$, and $Z_{pj}$ are the three-dimensional coordinates of the marker j in the camera coordinate system $O_c\text{-}X_cY_cZ_c$ of the measurement system, j=1~n; $D_{ij}$ is the distance between the marker i and the marker j; and $\lambda_i$ is the proportional coefficient of the equation i;

8) among the collected markers, three markers are selected and at least one of them does not coincide with the midpoint of the line connecting the other two markers; the normal vector of the plane where the three markers are located can be solved by the following formula:

$$\vec{N} = \overrightarrow{P_1P_2} \times \overrightarrow{P_2P_3}$$

where $P_1$ is the first marker, $P_2$ is the second marker, $P_3$ is the third marker, N is the normal vector of the plane where the above three markers are located; taking $P_2$ as the origin and the orientation vectors of $\overrightarrow{P_1P_2}$, $\vec{N}$, and $\vec{N}'$ as the coordinate directions, the coordinate system is established, and the target coordinate system $O_t\text{-}X_tY_tZ_t$ coincides with this coordinate system;

9) an attitude matrix R of the target coordinate system $O_t\text{-}X_tY_tZ_t$ relative to the camera coordinate system $O_c\text{-}X_cY_cZ_c$ is solved by a directional cosine matrix;

10) according to the image coordinates of the three markers and based on a pinhole imaging model, the translation matrix T of the target coordinate system $O_t\text{-}X_tY_tZ_t$ relative to the camera coordinate system $O_c\text{-}X_cY_cZ_c$ can be solved;

11) the attitude matrix of the object relative to the world coordinate system $O_w\text{-}X_wY_wZ_w$ can be derived as follows:

$$M = M_1M_2M_3,$$

where $M_1$ is the conversion matrix of the camera relative to the world coordinate system $O_w\text{-}X_wY_wZ_w$, $$M_2 = \begin{bmatrix} R & T \\ 0 & 1 \end{bmatrix},$$

$M_3$ is a pose conversion matrix of the tested object coordinate system $O_a\text{-}X_aY_aZ_a$ relative to the target coordinate system $O_t\text{-}X_tY_tZ_t$;

12) when the tested object is moving, the rotation optical components are controlled by the visual tracking algorithm to adjust the camera boresight so that the target is kept within the camera FOV, steps 4 to 11 are repeated.

2. The 6 DOF measuring system of claim 1 wherein at least one of the two rotation optical components comprising:
   a driving unit connected to a transmission unit and t processor;
   the transmission unit;
   an angle measuring unit mounted on the transmission unit;
   a prism mounted on the transmission unit, and the cross section of the prism is a right trapezoid.

3. The 6 DOF measuring system of claim 1 wherein the target comprising:
   a sleeve;
   marking rings which include marking shafts and rings, wherein the rings are nested on the outer diameter of the sleeve; the marking shafts are racially distributed on an outer side of each ring, and the markers are set at the hanging end of the marking shafts.

4. The 6 DOF measuring system of claim 1 wherein a filter is arranged between the camera and at least one of the rotation optical components.

5. The 6 DOF measuring system of claim 1 wherein the markers are spherical infrared light emitting diodes (LED).

6. The 6 DOF measuring system of claim 1 wherein an optical scanning field formed by two rotation optical components is not less than the camera FOV, and the combined imaging FOV formed by the camera and two rotation optical components is not less than the camera imaging FOV.

7. A 6 DOF measuring method comprising:
1) establishing a world coordinate system $O_w$-$X_w Y_w Z_w$, camera coordinate system $O_c$-$X_c Y_c Z_c$, target coordinate system $O_t$-$X_t Y_t Z_t$ and tested object coordinate system $O_a$-$X_a Y_a Z_a$;
2) calibrating a camera to obtain the internal and external parameters of the camera;
3) rotation optical components are controlled by a processor to adjust the camera boresight so that a target falls into the camera FOV;
4) the camera acquires images which include at least three markers, and then the image processing is carried out, and the image coordinates $(X_i, Y_i)$ $(i=1\sim n)$ of the markers are obtained;
6) according to a reverse ray tracing method and rotation angles of the rotation optical components, the exiting point $K_i (i=1\sim n)$ and the emergent beam vector $S_i (i=1\sim n)$ of the incident beam in the rotation optical component are obtained;
7) three-dimensional coordinates of markers can be obtained according to the following equation:

$$\begin{cases} \begin{bmatrix} X_{pi} \\ Y_{pi} \\ Z_{pi} \end{bmatrix} = \begin{bmatrix} X_{ki} \\ Y_{ki} \\ Z_{ki} \end{bmatrix} + \lambda_i \begin{bmatrix} X_{si} \\ Y_{si} \\ Z_{si} \end{bmatrix} \\ (X_{pi} - X_{pj})^2 + (Y_{pi} - Y_{pj})^2 + (Z_{pi} - Z_{pj})^2 = D_{ij}^2, i<j \end{cases}$$

where, $X_{pi}$, $Y_{pi}$, and $Z_{pi}$ are the three-dimensional coordinates of the marker i in the camera coordinate system $O_c$-$X_c Y_c Z_c$ of the measurement system; $X_{ki}$, $Y_{ki}$, and $Z_{ki}$ are the three-dimensional coordinates of $K_i$ in the camera coordinate system $O_c$-$X_c Y_c Z_c$ of the measurement system; $X_{si}$, $Y_{si}$, and $Z_{si}$ are the three-dimensional coordinates of $S_i$ in the camera coordinate system $O_c$-$X_c Y_c Z_c$ of the measurement system, $i=1\sim n$; $X_{pj}$, $Y_{pj}$, and $Z_{pj}$ are the three-dimensional coordinates of the marker j in the camera coordinate system $O_c$-$X_c Y_c Z_c$ of the measurement system, $j=1\sim n$; $D_{ij}$ is the distance between the marker i and the marker j and A is the proportional coefficient of the equation i;
8) among the collected markers, three markers are selected and at least one of them does not coincide with the midpoint of the line connecting the other two markers; the normal vector of the plane where the three markers are located can be solved by the following formula:

$\vec{N} = \overrightarrow{P_1 P_2} \times \overrightarrow{P_2 P_3}$ where $P_1$ is the first marker, $P_2$ is the second marker, $P_3$ is the third marker, N is the normal vector of the plane where the above three markers are located; taking $P_2$ as the origin and the orientation vectors of $\overrightarrow{P_1 P_2}$, $\vec{N}$, and $\vec{N'}$ as the coordinate directions, the coordinate system is established, and the target coordinate system $O_t$-$X_t Y_t Z_t$ coincides with this coordinate system;
9) an attitude matrix R of the target coordinate system $O_t$-$X_t Y_t Z_t$ relative to the camera coordinate system $O_c$-$X_c Y_c Z_c$ is solved by a directional cosine matrix;
10) according to the image coordinates of the three markers and based on a pinhole imaging model, a translation matrix T of the target coordinate system $O_t$-$X_t Y_t Z_t$ relative to the camera coordinate system $O_c$-$X_c Y_c Z_c$ can be solved;
11) the attitude matrix of the tested object relative to the world coordinate system $O_w$-$X_w Y_w Z_w$ can be derived as follows:

$M = M_1 M_2 M_3$, where $M_1$ is a conversion matrix of the camera relative to the world coordinate system $O_w$-$X_w Y_w Z_w$, $$M_2 = \begin{bmatrix} R & T \\ 0 & 1 \end{bmatrix},$$

$M_3$ is a pose conversion matrix of the tested object coordinate system $O_a$-$X_a Y_a Z_a$ relative to the target coordinate system $O_t$-$X_t Y_t Z_t$;
12) when the tested object is moving, the rotation optical components are controlled by a visual tracking algorithm to adjust the camera boresight so that the target is kept within the camera FOV, steps 4 to 11 are repeated.

8. The method of claim 7 wherein the visual tracking algorithm in step 12 can be described as that under the condition that the rotation angles of the rotation optical components are known, and taking the line between any marker and the focus F of camera as an incident beam, then an emergent beam vector of the rotation optical component is obtained by a vector ray tracing method; under the condition that the emergent beam vector is known, a reverse lookup-table method is used to solve the rotation angles of the rotation optical components.

9. The method of claim 8 wherein the steps to make a lookup table of the reverse lookup-table method comprising:
deciding the rotation step angle $\theta_{st}$ of a prism, and every revolution of prism rotation can be further divided into $360°/\theta_{st}$ steps; then emergent vectors at different angles are calculated according to the following equation and the lookup table of the relationship between the rotation angle and the unit vector of the emergent beam is established;

$$A_{out} = \frac{n_1}{n_2} A_{in} + \left\{ \sqrt{1 - \left(\frac{n_1}{n_2}\right)^2 [1 - (A_{in} \cdot N)^2]} - \frac{n_1}{n_2}(A_{in} \cdot N) \right\} N$$

where $A_{in}$ is the unit vector of an incident beam, $A_{out}$ is the unit vector of a refracted beam; N is the normal vector of the refractive surface; $n_1$ is the refractive index of incident medium and $n_2$ is the refractive index of emergent medium;

$$N = \begin{cases} (0, 0, 1), \text{ when the incident plane} \\ \quad \text{or the exit plane is vertical} \\ (\cos\theta_{ri}\sin\alpha, \sin\theta_{ri}\sin\alpha, \cos\alpha)^T, \\ \quad \text{when the exit plane is inclined} \\ (-\cos\theta_{ri}\sin\alpha, -\sin\theta_{ri}\sin\alpha, \cos\alpha)^T, \\ \quad \text{when the incident plane is inclined} \end{cases}$$

where $\theta_{ri}$ is the rotation angle of the ith prism, $\alpha$ is the wedge angle of the prism.

10. The reverse lookup-table method of claim 8 wherein the steps of this reverse lookup-table method are:

according to the unit vector of the emergent beam of the current rotation optical components, search the lookup table for the actual emergent beam closest to the target emergent beam, the error between them is given by, $$\Delta = \sqrt{(X_{rp}-x_{rp})^2 + (Y_{rp}-y_{rp})^2 + (Z_{rp}-z_{rp})^2}$$

where $X_{rp}$, $Y_{rp}$ and $Z_{rp}$ are the unit vector coordinates of the emergent beam recorded in the table, and $x_{rp}$, $y_{rp}$ and $z_{rp}$ are the unit vector coordinate of the emergent beam of a prism; then the related rotation angles can be determined according to the actual emergent beam.

* * * * *